United States Patent [19]

Slack et al.

[11] Patent Number: 5,212,275

[45] Date of Patent: May 18, 1993

[54] UREA AND BIURET PREPOLYMERS OF MDI

[75] Inventors: William E. Slack, Moundsville; Rick L. Adkins, New Martinsville, both of W. Va.

[73] Assignee: Miles Inc., Pittsburgh, Pa.

[21] Appl. No.: 957,498

[22] Filed: Oct. 7, 1992

[51] Int. Cl.$^5$ ............................................. C08G 18/10
[52] U.S. Cl. ...................................... 528/67; 528/59; 252/182.21
[58] Field of Search .............. 528/67, 59; 252/182.21

[56] References Cited

U.S. PATENT DOCUMENTS 3,862,973  1/1975  Dietrich et al. ............ 260/77.5 AT
4,618,706 10/1986  Scholl et al. ...................... 560/335

Primary Examiner—Maurice J. Welsh
Attorney, Agent, or Firm—Joseph C. Gil; Godfried R. Akorli

[57] ABSTRACT

Disclosed herein is a liquid isocyanate prepolymer having an isocyanate group content of from 10 to 30% by weight, prepared by reacting:

i) a polyfunctional secondary amine group containing material of the general formula:

$$(R-\underset{|}{\overset{H}{N}})_m A$$

wherein
R represents alkyl, alkenyl, cycloalkyl, aralkyl or aryl radical;
A represents an organic radical having a molecular weight between 28 and 6000 and having a functionality of m and
m represents an integer from 2 to 6;

with ii) an isocyanate mixture comprising:
  a) from 50 to 100% by weight of diphenylmethane diisocyanate of which from 2 to 50% by weight consist of 2,2'- and 2,4'-isomers; and
  b) the balance being polyphenylpolymethylene polyisocyanates.

3 Claims, No Drawings

UREA AND BIURET PREPOLYMERS OF MDI

BACKGROUND OF THE INVENTION

1. Field of the Invention

The present invention relates liquid isocyanates of methylene diphenylisocyanate (MDI) comprising isocyanate prepolymers of the MDI having urea and/or biuret groups in the prepolymer backbone which are prepared by reacting MDI of a specified composition with a select group of secondary amines.

2. Brief Description of the Prior Art

Urea and/or biuret containing isocyanate prepolymers are generally known in the art. U.S. Pat. No. 3,862,973 discloses biuret containing polyisocyanates which are prepared by reacting organic polyisocyanates with secondary amines at temperatures of from about 80 to 200 degrees Centigrade. Monoamines employed therein are selected from the group consisting of N-methyl aniline, N-ethylaniline, octadecylniline, diphenylamine, dibenzylamine, pyrrolidone, morpholine and the like. Polyamines employed therein are selected from the group consisting of N,N'-diethyl-4,4'-diaminodiphenylmethane, N,N'-diethyl-2,6-tolylene diamine, N,N'-diamino diphenylether and the like.

U.S. Pat. No. 4,618,706 discloses the process for the preparation of aromatic polyisocyanates containing urea and/or biuret groups, optionally in the form of a mixture of homologues and/or isomers by the reaction of aromatic diisocyanate with diamines having primary or secondary amino groups at about 20 to 180 degrees Centigrade.

Quite often, the preparation of these prepolymers entails the reaction of polyisocyanates with mono or polyamines at elevated temperatures. The use of high temperatures is uneconomical and can result in product discoloration, and in some cases the liberation of volatile and toxic by products via a series of biuret exchange reactions.

Several methods have been developed to overcome the problems associated with high temperatures. By the present invention there is provided a facile process for preparing liquid isocyanates containing urea and/or biuret groups.

SUMMARY OF THE INVENTION

In accordance with the foregoing, the present invention encompasses a liquid isocyanate prepolymer having an isocyanate group content of from 10 to 30% by weight, prepared by reacting:

i) a polyfunctional secondary amine group containing material of the general formula:

wherein
R represents alkyl, alkenyl, cycloalkyl, aralkyl or aryl radical;
A represents an organic radical having a molecular weight between 28 and 6000 and having a functionality of m, and
m represents an integer from 2 to 6; with ii) an isocyanate mixture comprising a) from 50 to 100% by weight of diphenylmethane diisocyanate of which from 2 to 5)% by weight consist of 2,2'- and 2,4'-isomers; and
b) the balance being polyphenylpolymethylene polyisocyanates.

Also encompassed by the claimed invention is the process for preparing the liquid isocyanates of the claimed invention. The liquid isocyanates prepared by this process have been found to be stable at 25 degrees Centigrade.

DETAILED DESCRIPTION OF THE INVENTION

The useful amines in the preparation of the liquid isocyanate prepolymers comprise polyfunctional secondary amine group containing materials of the general formula:

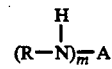

wherein
R represents alkyl, alkenyl, cycloalkyl, arakyl or aryl radical
A represents an organic radical having a molecular weight between 28 and 6000 and having a functionality of m and
m represents an integer from 2 to 6.

In the above formula, the alkyl radical can contain from 1 to 36 and preferably 4 to 16 carbon atoms. Illustrative but non-limiting examples of the alkyl radical can be selected from the group consisting of butyl, 2-ethylhexyl, cyclohexyl, cetyl and octyl with 2-ethylhexyl being preferred. The alkenyl radical can contain from 3 to 18 and preferably 3 to 10 carbon atoms. Illustrative but non-limiting examples of the alkenyl radical can be selected from the group consisting of butenyl, phenylpropenyl, octenyl, propenyl and octadecenyl with octenyl being preferred. The cycloalkyl radical can contain from 4 to 8 and preferably 5 to 6 ring carbon atoms. The alkyl moiety of the cycloalkyl radical is essentially the same as the alkyl radical described hereinabove. Illustrative but non-limiting examples of the cycloalkyl radical can be selected from the group consisting of cyclohexyl cyclobutyl cycloactyl cycloheptyl and methylcyclohexyl with cyclohexyl being preferred. The aralkyl radical can contain from 7 to 20 and preferably 7 to 12 carbon atoms. The alkyl moiety of the aralkyl radical is essentially the same as the alkyl radical described hereinabove. Illustrative but non-limiting examples of the aralkyl radical can be selected from the group consisting of benzyl phenethyl phenylbutyl phenylpropyl and naphthylmethyl with benzyl being preferred. The aryl radical can contain from 6 to 10 carbon atoms. Illustrative but non-limiting examples of the aryl radical can be selected from the group consisting of phenyl, tolyl, xylyl and naphthyl with phenyl being preferred. It is desired to point out that the R radical can contain substituents as long as the substituents do not adversely affect the preparation or use of the subject amine-terminated polyether.

The organic radical A is that which is left from the removal of a hydroxyl group of a polyether polyol as described more fully hereunder. The organic radical has a molecular weight between 28 and 6000 and preferably 200 to 6000. m represents an integer of 2 to 6 and preferably 2 to 3. The useful amines are typically amine-terminated polyethers having a functionality of between 2 and 4, and a molecular weight of from 200 to 6000. They are further characterized in that they have relatively low viscosities ranging from about 50 to 5000 centipoises, and an equivalent weight based on amine functional group ranging from 50 to 2500.

In accordance with the process of the invention, the amine-terminated polyether is prepared by reacting a polyether containing a terminal leaving group with a primary amine, at a temperature of about 70 to 250 degrees Centigrade optionally in the presence of an acid scavenger such as a tertiary amine or an inorganic base such as sodium hydroxide. The polyether containing a terminal leaving group can be obtained by converting a hydroxyl group of a polyether polyol to a suitable leaving group. A good leaving group is that which can be displaced at the carbon atom by nucleophiles such as nitrogen, oxygen, sulfur, etc. or the anions of these nucleophiles. As would be realized, the rate at which displacement occurs depends on the chemical nature of the leaving group, and the more stable the free entity of the leaving group is, the easier the leaving group is displaced. In accordance with the invention, a good leaving group is that which is effective in producing the reaction products described herein. Examples of the leaving groups can be selected from the group consisting of halides, sulfonates, nitrophenoxides and the like.

In preparing a polyether containing a halide leaving group, for example, a polyether polyol is reacted with a halogenation reagent, e.g., carbonyl chloride. The resulting chloroformate rearranges to form a polyether alkyl chloride. Other halogenation reagents that can be reacted with a polyether polyol can be thionyl chloride, methanesulfonyl chloride in DMF or triphenyl phosphine in carbon tetrachloride.

Illustrative but non-limiting examples of the polyethers containing hydroxyl groups suitable for use in accordance with the invention can be obtained by the polymerization of alkylene oxides such as ethylene oxide, propylene oxide, butylene oxide, tetrahydrofuran, styrene oxide or epichlorohydrin on their own, for example in the presence boron trifluoride, or by the addition of these epoxides, optionally in admixture or successively onto starter components containing reactive hydrogen atoms, such as water, alcohols or amines, for example ethylene glycol, 1,3- or 1,2-propylene glycol, trimethylol propane, 4,4'-dihydroxydiphenyl propane, aniline, ammonia, ethanolamine or ethylene diamine or a mixture thereof.

In preparing the polyether alkyl halide, a polyether polyol can be reacted with a halogenating agent such as carbonyl chloride at a temperature ranging typically from 0 to 40 degrees Centigrade over a period of 2 to 8 hours. The resultant chloroformate rearranges at temperature ranging from 75 to 150 and preferably 100 to 120 degrees Centigrade, in the presence of a tertiary amine or amide to produce polyether alkyl chloride. Alternatively, carbonyl chloride can be added to a solution of the polyether polyol in N,N-dimethylformamide to form the chloride directly.

In preparing a polyether sulfonate, a polyether polyol can be reacted with a reagent such as methanesulfonyl chloride in the presence of a tertiary amine or amide. The reaction can be conducted at a temperature in the range of −30 to 40 degrees Centigrade.

Solvents such as methylene chloride, ioluene, chlorobenzene or tetrahydrofuran can be employed in the above methods of preparing the polyether with a leaving group.

Primary monoamines are reacted with the polyethern containing a leaving group over a temperature range of 70 to 250 degrees Centigrade to produce the amine-terminated polyethers of the invention. The amine useful herein include aliphatic or aromatic mono and diamines having between 1 and 18 carbons. Illustrative but non-limiting examples of amines can be selected from the group consisting of butylamine, aniline, cyclohexylamine, 2-ethylhexylamine and a mixture thereof. The ratio of mole of amine to equivalents of leaving group of the polyether is between the ratio of 12 to I and 1 to 1 and preferably 3 to 1. Sodium bicarbonate or sodium hydroxide can be employed as an acid scavenger in the amine displacement) reaction. It is believed that the polyether leaving group undergoes a displacement reaction to give secondary amines. Any good solvent such as methylene chloride, toluene, chlorobenzene, or THF can be used if desired, in the reactions.

The resulting amine-terminated polyethers are obtained in high yields (greater that 90%) with relatively low viscosities of about 50 centipoises for 100 equivalent weight difunctional amine-terminated polyether to 2000 centipoises for a 2000 equivalent weight trifunctional amine-terminated polyether.

As afore-stated, the useful isocyanates useful herein is an isocyanate mixture comprising
 a) from 50 to 100% by weight of diphenylmethane diisocyanate of which from 2 to 50% ald preferably 2 to 35 by weight consist of 2,2'- and 2,4'-isomers, and
 b) the balance being polyphenylpolymethyene polyisocyanates.

In the process for preparing the liquid isocyanates of the claimed invention, the secondary amine terminated polyether and the isocyanate mixture are reacted at temperatures of from about 40° C. to about 140° C. and preferably, at temperatures of less than 120° C. with stirring. The reaction is monitored by NCO titration, until the reaction mixture shows no change in the NCO content over a 20 minute period at the reaction temperature. It is then cooled to about 25° C. The resultant liquid isocyanate is characterized by having an NCO content between 10 and 30% by weight. The liquid isocyanates can be useful in preparing polyurethane products.

The invention is further illustrated by that following non-limiting examples.

EXAMPLES

To provide storage stable (25° C.) liquid isocyanates of the MDI type in accordance with the invention, the following were employed.

Polyols

In the examples which follow, these polyols were used:

Polyol A: A glycerine/propylene oxide/ethylene oxide adduct, with the ethylene oxide being present as a 17% by weight termination, having a 4800 molecular weight.

Polyol B: A polytetrahydrofuran ether diol having a 1000 molecular weight.

Polyol C: A glycerine/propylene oxide adduct having a 1500 molecular weight.

Polyol D: A trimethylol propane/propylene oxide adduct having a 455 molecular weight.

Polyol E: A propylene/glycol/propylene oxide/ethylene oxide adduct, with the ethylene oxide being present as a 17% by weight termination, having a 2000 molecular weight.

Polyol F: A glycerine/propylene oxide/ethylene oxide adduct, with the ethylene oxide being present as a 17% by weight termination, having a 3000 molecular weight.

Chloroformate Preparation

Polyol A (3.0 eq) was added to a 5L 3.necked flask fitted with a stirrer and dry ice/acetone condenser. Phosgene (3.75 moles) was added at 1.5 mole/h, keeping the reaction temperature below 35° C. After the phosgene addition was complete, the reaction mixture was stirred at room temperature for an additional 2 hours. The chloroformate was purged with $N_2$ at 40° C. to remove residual phosgene Titration of Chloroformate A showed 100% conversion. All choroformates listed in Table I were made using this procedure.

TABLE I

| Chloroformate | Polyol Precursor |
|---|---|
| A | A |
| B | B |
| C | C |
| D | D |
| E | E |
| F | F |

ATP-1

Chloroformate A (2.20 eq) was added to a 12L 3-necked flask with a stirrer and reflux condenser. The flask was purged with nitrogen and the chloroformate was heated to 60° C. N,N-dimethylformamide (4.40 mole) was added, keeping the reaction temperature at 60° C. The reaction solution was then heated at 100° C. for 1 h, after which the DMF was vacuum stripped. Octylamine (13.17 mole) was added and the solution was heated at 190° C. for 17 h. The solution was cooled and neutralized with NaOH (2.20 mole). Excess octylamine was vacuum stripped and the product filtered to give a clear, light yellow liquid with a viscosity of 782 mPa.s and an amine of 29.6. The conversion was 90.4% based on the amine number.

ATP-2 through 7

ATP-2 through 7 were prepared using the identical procedure described for ATP-1 except for the changes indicated in Table 2, while keeping the moles/equivalents ratios constant.

TABLE 2

| | | AMINE DISPLACEMENT REACTION | | | | |
|---|---|---|---|---|---|---|
| ATP | Chloro-formate | Amine | Temp. Deg. C. | Time Hr | Amine # | Viscosity mPa.s, 25° C. |
| 1 | A | 1-Octylamine | 190 | 17.0 | 29.6 | 782 |
| 2 | B | 2-ethylhexyl-amine | 180 | 4.5 | 89.0 | 370 |
| 3 | C | Aniline | 180 | 5.0 | 73.3 | 710 |
| 4 | D | Aniline | 180 | 5.0 | 210.3 | 4520 |
| 5 | E | Cyclohexyl-amine | 140 | 4.5 | 37.1 | 440 |
| 6 | F | 2-ethylhexyl-amine | 170 | 16.0 | 42.2 | 300 |
| 7 | A | p-Anisidine | 190 | 17.0 | 31.6 | 1920 |

MDI x/y

Where X represents the total of diisocyanate in the isocyanate and where y represents the total 2,2'- and 2,4'-isomers of MDI in the isocyanate. When x is less than 100 the difference is made up with the higher homologs of MDI.

The invention is further illustrated hut is not intended to be limited by the following examples in which all parts and percentages are by weight unless otherwise specified.

EXAMPLE 1

27 parts of ATP-2 were added to 100 parts of MDI 78/25 at 55° C. with good stirring. The reaction mixture was stirred at 55° C. for an additional 30 minutes. The reaction product was cooled to 25° C. to give a clear liquid having an NCO content of 24.0% and a viscosity at 25° C. of 355 mPa.s.

Table 3 gives the results of reacting 100 parts of MDI 78/25 with ATPs 3, 4, 5 and 6 using the identical procedure described in Example 1.

TABLE 3

| Example | ATP | parts ATP | Appearance | %-NCO | Viscosity at 25° C., mPa.s |
|---|---|---|---|---|---|
| 2 | 6 | 31.0 | clear | 24.2 | 250 |
| 3 | 5 | 31.5 | clear | 24.3 | 370 |
| 4 | 3 | 28.5 | clear | 24.3 | 360 |
| 5 | 4 | 21.0 | clear | 24.2 | 1640 |

EXAMPLE 6

29.0 parts of ATP-7 was added to 100 parts of MDI 78/25 at 120° C. with good stirring. The reaction mixture was stirred for an additional 40 minutes at 120° C. then cooled to 25° C. The product was a clear liquid having an NCO content of 24.1% and a viscosity at 25° C. of 336 mPa.s.

Table 4 gives the results of reacting 100 parts of MDI 78/25 with ATPs 1 and 4 using the identical procedure described in Example 6.

TABLE 4

| Example | ATP | parts ATP | Appearance | % NCO | Viscosity at 25° C., mPa.s |
|---|---|---|---|---|---|
| 7 | 1 | 30.0 | clear | 24.0 | 266 |
| 8 | 4 | 15.0 | clear | 24.3 | 960 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A liquid isocyanate prepolymer having an isocyanate group content of from 10 to 30% by weight, prepared by reacting:

i) a polyfunctional secondary amine group containing material of the general formula:

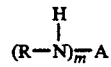

wherein

R represents alkyl alkenyl cycloalkyl aralkyl or aryl radical;

A represents an organic radical having a molecular weight between 28 and 6000 and having a functionality of m and m represents an integer from 2 to 6;

with ii) an isocyanate mixture comprising:
   a) from 50 to 100% by weight of diphenylmethane diisocyanate of which from 2 to 50% by weight consist of 2,2'- and 2,4'-isomers; and
   b) the balance being polyphenylpolymethylene polyisocyanates.

2. The liquid isocyanate prepolymer of claim 1 wherein, the polyfunctional secondary amine group containing material, is a reaction product of a polyether containing a terminal leaving group and a primary amine.

3. The liquid isocyanate prepolymer of claim 2 wherein the isocyanate mixture comprises:
   a) from 50 to 100% by weight of diphenylmethane diisocyante of which 2 to 35% by weight consists of 2,2'-and 2,4'-isomers, and
   b) the balance being polyphenylpolymethylene polyisocyanate.

* * * * *